Figure 5:
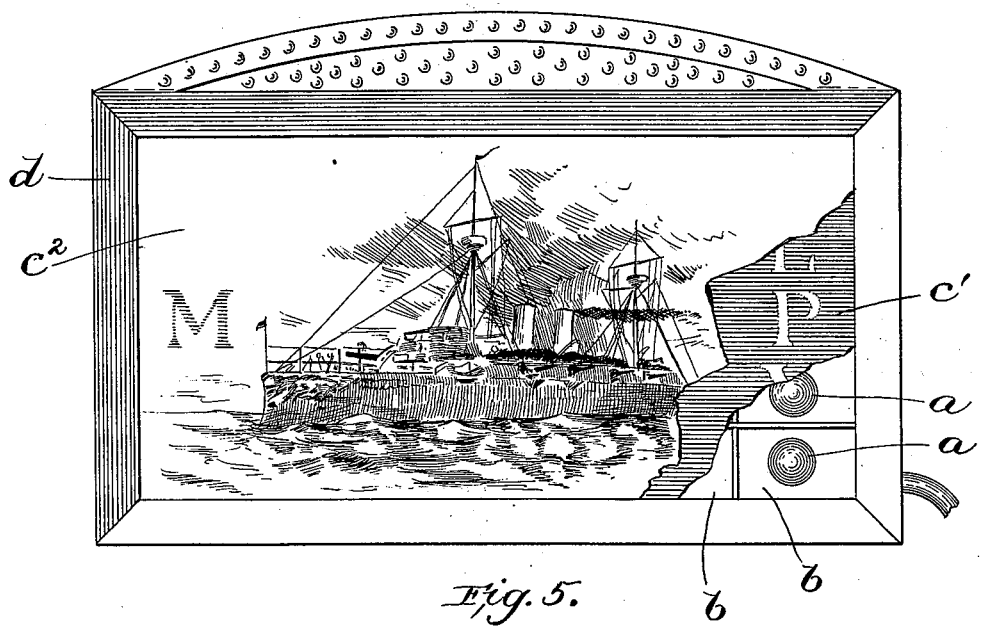

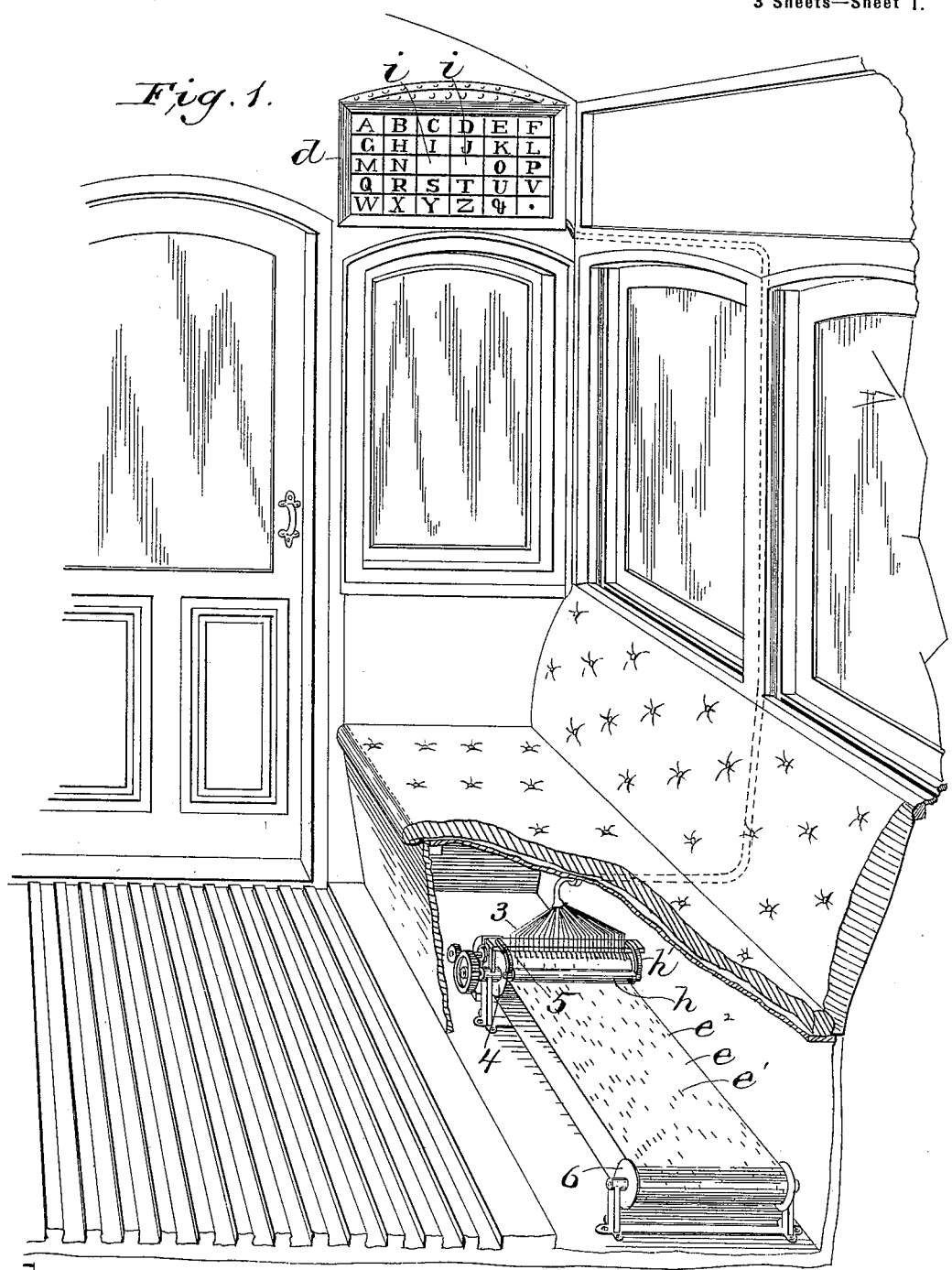

No. 636,721. Patented Nov. 7, 1899.
W. H. GILMAN.
ADVERTISING APPARATUS.
(Application filed Aug. 28, 1897.)
(No Model.) 3 Sheets—Sheet 2.
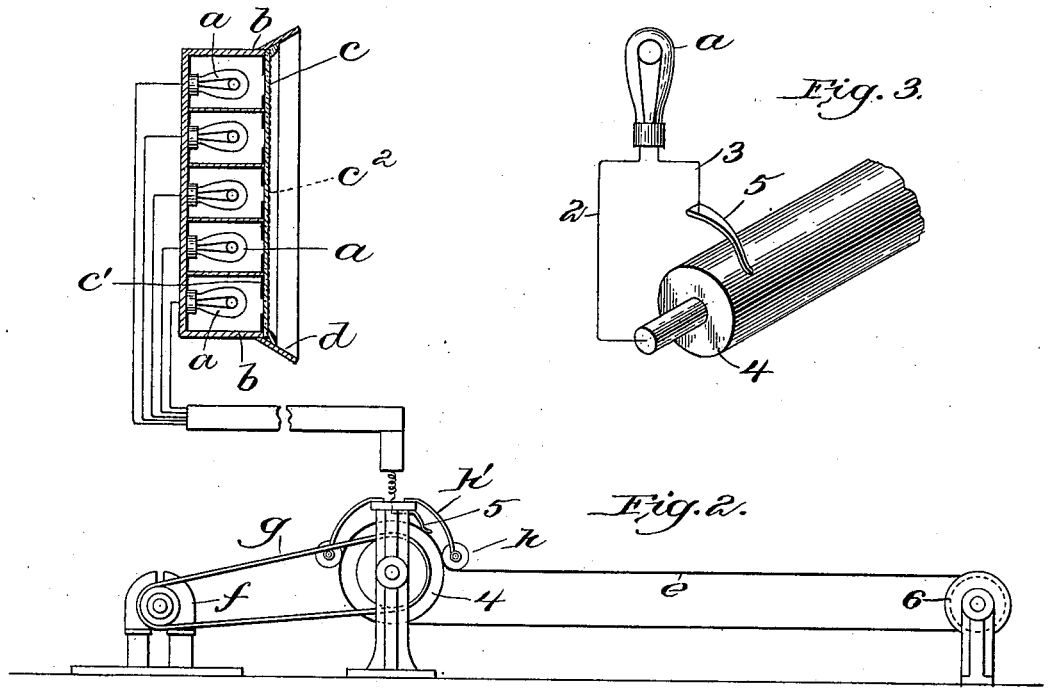
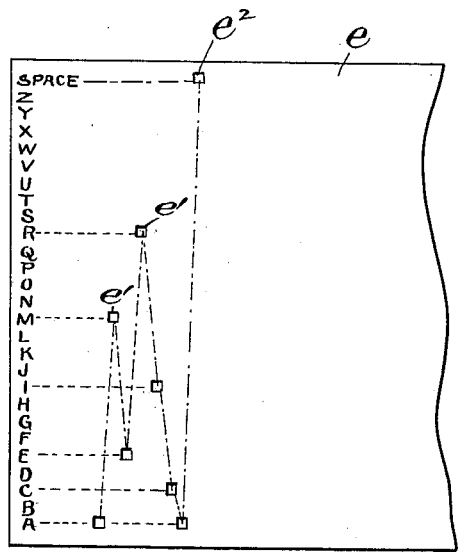

No. 636,721. Patented Nov. 7, 1899.
W. H. GILMAN.
ADVERTISING APPARATUS.
(Application filed Aug. 28, 1897.)

(No Model.) 3 Sheets—Sheet 3.

UNITED STATES PATENT OFFICE.

WILLARD H. GILMAN, OF BOSTON, MASSACHUSETTS, ASSIGNOR, BY DIRECT AND MESNE ASSIGNMENTS, TO FREDERICK L. MILLIKEN, TRUSTEE, OF MILTON, MASSACHUSETTS.

ADVERTISING APPARATUS.

SPECIFICATION forming part of Letters Patent No. 636,721, dated November 7, 1899.

Application filed August 28, 1897. Serial No. 649,842. (No model.)

*To all whom it may concern:*

Be it known that I, WILLARD H. GILMAN, of Boston, in the county of Suffolk and State of Massachusetts, have invented certain new and useful Improvements in Advertising Apparatus, of which the following is a specification.

This invention has for its object to provide a simple and effective apparatus for intermittently displaying symbols in accordance with a predetermined program upon a translucent pane bearing a picture or design, the symbols being, for example, the letters of the alphabet displayed in such order that they spell out a word or series of words.

The invention consists in an advertising apparatus comprising the novel features of construction and arrangement which I shall now proceed to describe and claim.

Of the accompanying drawings, forming a part of this specification, Figure 1 represents a perspective view of a portion of the interior of a street-car provided with an advertising apparatus constructed in accordance with my invention, the front covering or translucent pane of the display-casing being omitted. Fig. 2 represents a side elevation showing the principal parts of the apparatus. Fig. 3 represents a diagrammatic view showing one of the incandescent lamps and the branch circuit in which it is included. Fig. 4 represents a view of a portion of the perforated sheet or strip which automatically breaks and closes the branch circuits. Fig. 5 represents a front elevation of the display-casing.

The same letters and numerals of reference indicate the same parts in all the figures.

In the drawings, $a\ a$ represent a series of incandescent electric lamps which are arranged in a group in any suitable order, each lamp being inclosed in a cell or casing $b$, which has a light-outlet in the form of a symbol, such as a letter of the alphabet. I prefer to employ a series of lamps corresponding in number to the number of letters in the alphabet, so that any word or series of words can be spelled out by illuminating the lamps successively in suitable order. The light-openings of the cells $b$ may be formed by applying to a sheet or plate $c$ of glass, which extends across the outer ends of the cells $b$, an opaque coating of paint or other suitable material, said coating being interrupted to form a passage for light of the form of the desired symbol. In Fig. 2 the opaque coating is represented at $c'$. The glass plate or covering $c$ is inclosed in a frame $d$ and is preferably provided on its outer surface with a translucent coating $c^2$, composed of suitable coloring-matter, such as oil-paint, disposed to form a picture or other design, the coating $c^2$ being of such nature that when one of the lamps $a$ is illuminated the light issuing from the corresponding light-opening will shine through the coating $c^2$ and will show clearly through said coating the form of the light-opening. It will be seen, therefore, that by forming the translucent coating $c^2$ of a number of colors the whole may be disposed to form a landscape or other design, as shown in Fig. 5, the lamp-covering $c$ and its frame $d$ presenting the appearance of a picture, through which are flashed the symbols or representations defined by the light-openings of the cells $b$.

The translucent coating $c^2$ instead of being applied to the glass plate $c$ may be applied to a separate plate or pane composed of a material, such as porcelain, through which the light can shine freely, the principal requisite being to provide a picture which is continually visible and upon which advertising symbols may be intermittently projected.

A picture such as that above described presents an opaque appearance when illuminated wholly from the front and is obscurable or rendered invisible to the eye of an observer by an excess of light thrown upon the back of the pane or plate on which the picture is painted. Hence areas of light projected on the pane through the light-openings by the lamps have the effect of temporarily effacing the corresponding parts of the picture, said parts being brightly illuminated and caused by the translucence of the picture to stand out in sharp contrast with the surrounding portions of the picture which are not thus illuminated. Said surrounding parts therefore retain the opaque effect and constitute a frame or setting for the illuminated areas on which the picture is obscured or effaced. The startling effect produced by the sudden disappearance of portions of an apparently opaque picture while other portions remain unchanged gives the apparatus its chief value for advertising purposes.

The filament of each lamp $a$ is included in a branch circuit, which may include a wire 2, connected with one end of the filament, a wire 3, connected with the other end of the filament, a terminal 4, connected with the wire 2, and a terminal 5, connected with the wire 3. As here shown, the terminal 4 is an elongated roll or cylinder, which is connected with the wires 2 of all the branch circuits, while the terminal 5 is a narrow resilient strip connected with only one of the wires 3, there being, therefore, as many terminals 5 as there are lamps $a$. The terminals 5 are adapted to normally make contact with the terminal 4, thus closing the branch circuits, the terminal 4 being permanently connected with the main circuit, which receives electricity from a suitable source of supply.

$e$ represents a sheet or strip of insulating material, preferably flexible, such as paper, which is interposed between the terminal 4 and the series of terminals 5 and serves to prevent electric contact between said terminals, excepting when perforations $e'$, formed in the sheet $e$, coincide with the free ends of the terminals 5, thus allowing said free ends to make contact with the terminal 4. The sheet $e$ is preferably made in the form of an endless band passing around the cylinder which constitutes the terminal 4 and around another cylinder 6. The perforations in the sheet $e$ are formed so that only one branch circuit can be closed at a time, the arrangement of the perforations being such that as the sheet $e$ is moved progressively between the terminals 4 and 5 the lamps intended to be operated will be illuminated successively and in such order as to spell a word or series of words, as will be understood by reference to Fig. 4, where an arrangement of perforations designed to display the word "America" is shown.

The sheet $e$ may be moved progressively by any suitable means. I have here shown an electric motor $f$, the armature-shaft of which is connected by a belt $g$ with the shaft of the terminal or cylinder 4. $h$ represents a pressure-roll supported by resilient arms $h'$ and arranged to press the sheet $e$ against the cylinder 4 at a point in advance of the terminals 5.

From the foregoing it will be seen that when the sheet $e$ is moved progressively it will automatically break and close the several branch circuits connected with the terminals 5 that are allowed to make contact with the terminal 4 by the perforations in the sheet, so that spectators watching the frame $d$ and the matter inclosed thereby will see symbols or letters appearing and disappearing successively and spelling out the word or series of words for which the sheet $e$ has been perforated. The frame $d$ may be placed in any suitable location and is shown in Fig. 1 as placed in one end of a street-car, the sheet $e$ and the mechanism with which it coöperates being placed below one of the seats of the car.

The apparatus may be arranged to show a rectangular or other predetermined block or area of light to mark the spaces between words, and to this end one or more of the cells or casings $b$ may have its entire outer end open instead of being provided with a light-opening formed as a symbol or letter. In Fig. 1 I show two such openings $i\ i$. The lamps behind these openings are or may be connected with terminals 5 at one end of the row, these terminals being permitted to make contact with the terminal 4 by special perforations $e^2$, which are arranged to close one of the branch circuits after each word has been spelled.

The construction above described provides for the use of interchangeable advertising symbols, owing to the fact that either of the lamps $a$ may be utilized, and they may be used successively in any prearranged order, as desired.

I do not wish to be confined to the precise details of construction and arrangement hereinbefore set forth, as the same may be variously modified without departing from the spirit of my invention.

I claim—

1. An advertising apparatus comprising a translucent pane or sheet having a picture or design, said picture presenting an opaque appearance when illuminated wholly from the front, and being obscurable or effaceable by an excess of light from the back, and means for admitting light to portions of the back of the pane, whereby the corresponding portions of the picture are obscured or effaced, the other portions of the picture remaining visible and forming a framing or setting for the portions of the pane on which the picture is thus obscured or effaced, said last-mentioned portions being illuminated and caused by the translucence of the pane or sheet to stand out in strong contrast with the surrounding portions of the picture, so that relatively small areas having the form of letters may be flashed conspicuously upon any desired part or parts of the picture.

2. An advertising apparatus comprising a translucent pane or sheet having a picture or design, said picture presenting an opaque appearance when illuminated wholly from the front, and being obscurable or effaceable by an excess of light from the back, a series of incandescent lamps located behind said pane, a member interposed between the pane and the lamps and provided with light-outlets differing in design, and means for intermittently illuminating the lamps to form illuminated areas on the pane, said illuminated areas temporarily obscuring or effacing the corresponding portions of the picture and contrasting strongly with the unobscured portions thereof.

In testimony whereof I have signed my name to this specification, in the presence of two subscribing witnesses, this 26th day of August, A. D. 1897.

WILLARD H. GILMAN.

Witnesses:
  H. L. ROBBINS,
  E. BATCHELDER.